(12) United States Patent
Wu (10) Patent No.: US 10,737,866 B2
(45) Date of Patent: Aug. 11, 2020

(54) BOTTLE CAP STRUCTURE (71) Applicant: QUANZHOU YIDA HOME APPLIANCE INDUSTRY CO., LTD., Quanzhou, Fujian Province (CN)

(72) Inventor: Andy Wu, Quanzhou (CN)

(73) Assignee: QUANZHOU YIDA HOME APPLIANCE INDUSTRY CO., LTD., Quanzhou (CN)

( * ) Notice: Subject to any disclaimer, the term of this patent is extended or adjusted under 35 U.S.C. 154(b) by 199 days.

(21) Appl. No.: 15/954,780

(22) Filed: Apr. 17, 2018

(65) Prior Publication Data
US 2019/0135517 A1    May 9, 2019

(30) Foreign Application Priority Data

Nov. 3, 2017    (CN) .................... 2017 2 1452424 U (51) Int. Cl.
| | | |
|---|---|---|
| B65D 81/20 | (2006.01) | |
| B65D 51/16 | (2006.01) | |
| A47G 19/22 | (2006.01) | |
| A23L 2/42 | (2006.01) | |
| A23L 3/00 | (2006.01) | |
| B65D 47/08 | (2006.01) | |
| A23L 3/3418 | (2006.01) | |

(52) U.S. Cl.
CPC ............ *B65D 81/2038* (2013.01); *A23L 2/42* (2013.01); *A23L 3/001* (2013.01); *A47G 19/2205* (2013.01); *A47G 19/2272* (2013.01); *B65D 47/0876* (2013.01); *B65D 51/1644* (2013.01); *A23L 3/3418* (2013.01); *A23V 2002/00* (2013.01)

(58) Field of Classification Search
CPC ............ B65D 81/2038; B65D 47/0876; B65D 51/1644; B65D 81/2015; B65D 51/1683; B65D 47/06; A47G 19/2205; A47G 19/2272; A23L 3/001; A23L 2/42; A23L 3/3418; A23V 2002/00; A47J 43/042
USPC .......................................................... 215/260
See application file for complete search history.

(56) References Cited

U.S. PATENT DOCUMENTS

| | | | | |
|---|---|---|---|---|
| 4,684,033 A | * | 8/1987 | Marcus ..................... | C12H 1/22 215/269 |
| 4,828,149 A | * | 5/1989 | Hester .................... | G01F 11/261 222/207 |
| 6,234,412 B1 | * | 5/2001 | von Schuckmann ........ | B05B 1/3436 239/333 |
| 6,758,364 B1 | * | 7/2004 | Rohrig ............... | A47G 19/2272 215/387 |

(Continued)

FOREIGN PATENT DOCUMENTS

CN           205410783 U      8/2016

*Primary Examiner* — Ernesto A Grano
(74) *Attorney, Agent, or Firm* — Alan D. Kamrath; Karin L. Williams; Mayer & Williams PC (57) ABSTRACT

A bottle cap includes a vacuum unit, a pressure relief unit and a drinking water pipe unit. After the bottle cap is combined with a bottle, the vacuum unit can vacuum the interior of the bottle to preserve food or drink inside the bottle, and the pressure relief unit may be operated to release the air pressure in the bottle in order to open the bottle cap, or open a flip cover of the drinking water pipe unit to drink the fruit juice or water from the bottle. The bottle cap has the effects of preserving the food or drink in the bottom and facilitating drinking.

6 Claims, 8 Drawing Sheets

(56) References Cited

U.S. PATENT DOCUMENTS

| | | | |
|---|---|---|---|
| 2002/0014276 A1* | 2/2002 | Clusserath | B67C 3/065 141/40 |
| 2003/0070563 A1* | 4/2003 | Wang | A23L 3/0155 99/472 |
| 2003/0197011 A1* | 10/2003 | Nieh | B65D 81/2015 220/231 |
| 2005/0000984 A1* | 1/2005 | Tan | B67D 1/0009 222/67 |
| 2005/0051551 A1* | 3/2005 | Galletti | B65D 81/2038 220/212 |
| 2005/0133540 A1* | 6/2005 | Hornsby | B05B 1/3436 222/333 |
| 2005/0133626 A1* | 6/2005 | Hornsby | B05B 15/33 239/380 |
| 2005/0244293 A1* | 11/2005 | Lin | B65D 81/2038 417/510 |
| 2008/0006718 A1* | 1/2008 | Junkel | A45F 3/16 239/333 |
| 2010/0301072 A1* | 12/2010 | Hammarin | B65D 41/48 222/449 |
| 2011/0290824 A1* | 12/2011 | Smith | B65D 1/32 222/135 |
| 2012/0111863 A1* | 5/2012 | Wang | B65D 47/247 220/203.29 |
| 2014/0371690 A1* | 12/2014 | Sprada | A61M 35/003 604/290 |
| 2015/0282651 A1* | 10/2015 | Paauwe | B67D 1/0845 215/40 |
| 2015/0284163 A1* | 10/2015 | Manwani | B67D 3/0067 222/105 |
| 2015/0359364 A1* | 12/2015 | Sweeney | G01F 13/006 206/459.1 |
| 2016/0106241 A1* | 4/2016 | Wong | A45F 3/16 220/254.5 |
| 2016/0345614 A1* | 12/2016 | Yan | B65B 31/042 |
| 2017/0066640 A1* | 3/2017 | Rumigny | B65D 47/2056 |
| 2017/0129688 A1* | 5/2017 | Murrell-Cole | B65D 1/0284 |
| 2017/0190496 A1* | 7/2017 | Yang | B65D 43/02 |
| 2017/0297784 A1* | 10/2017 | Peng | B65D 41/04 |
| 2018/0009589 A1* | 1/2018 | Ho | B65D 21/0219 |
| 2018/0127165 A1* | 5/2018 | Smaldone | B65D 55/14 |
| 2019/0084705 A1* | 3/2019 | Lin | B65B 31/047 |
| 2019/0375573 A1* | 12/2019 | Wang | B65D 81/2038 |

* cited by examiner

BOTTLE CAP STRUCTURE

BACKGROUND OF THE INVENTION

Field of the Invention

The present invention relates to a bottle cap structure, and more particularly to the bottle cap capable of vacuuming the bottle to provide a preservation effect of the food stored in the bottle, and the bottle has a pressure relief function, so that the bottle cap can be opened easily, and the bottle cap also has a drinking water pipe, so that a flip cover of the drinking water pipe can be opened for drinking.

Description of the Related Art

Figure 1:
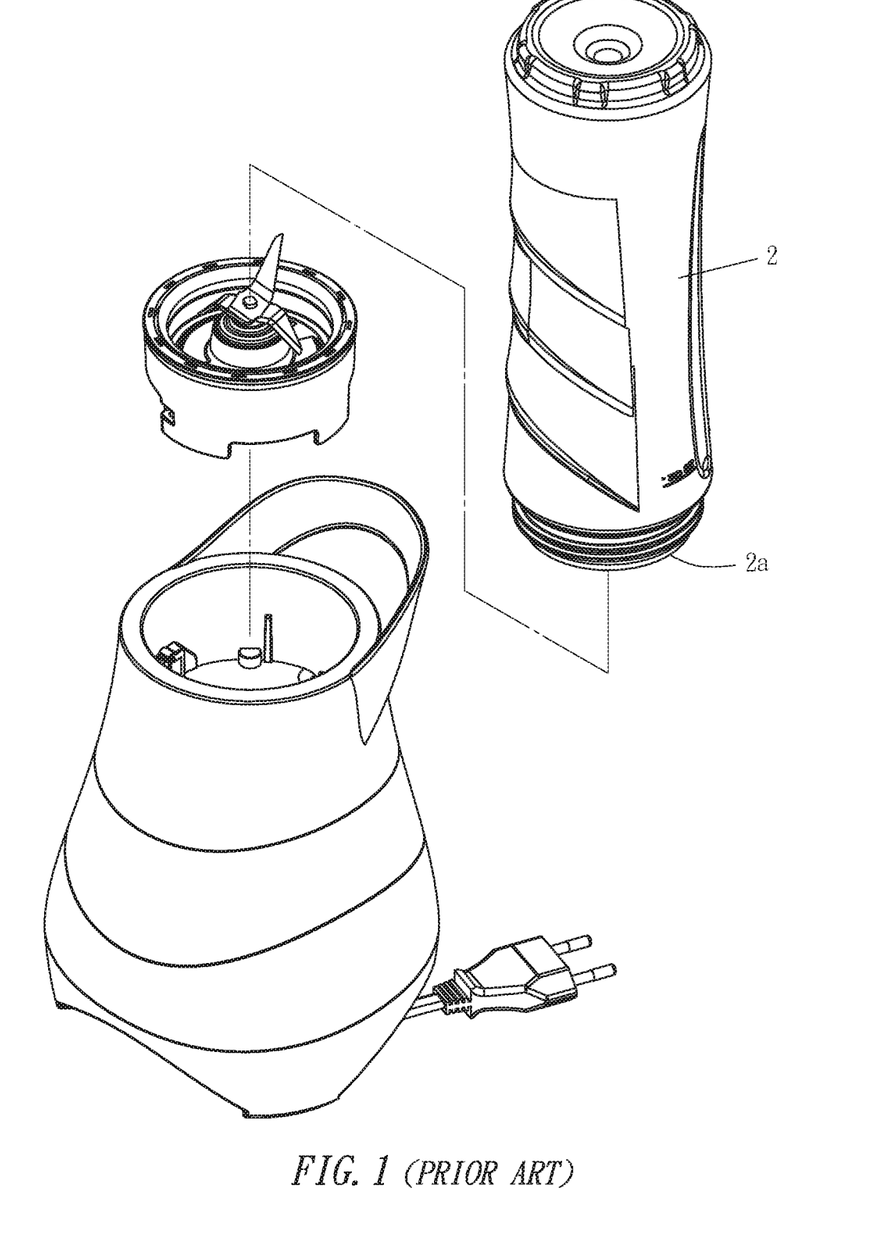
FIG. 1 is an exploded view of the Prior Art.

In general, portable fruit juice devices, cups, or bottles come with a small body and a small base, so that they can be carried out for use conveniently. As disclosed in P.R.C. Pat. Application No. CN201520943711.2 entitled "Portable blender with a juicing function" and filed by the inventor of the present invention (hereinafter referred to as "Prior Art" as shown in FIG. 1). In this Prior Art, a mixing cup is separated from a base after the juicing is finished, and then a cup lid is covered onto the blender, so that the portable blender can be carried out conveniently and used for drinking fruit juice anytime. However, after the operation of the conventional fruit juice blender is completed, the blender is in contact with air and will be oxidized easily. In view of the drawbacks of the conventional blender, the inventor of the present invention conducted extensive research and experiment, and finally designed a bottle cap structure and developed a bottle cap in accordance with the present invention.

SUMMARY OF THE INVENTION

Therefore, it is a primary objective of the present invention to provide a bottle cap structure capable of vacuuming a bottle after the bottle cap structure is combined with the bottle to provide a preservation effect of the food stored in the bottle, and the bottle has a pressure relief function, so that the bottle cap can be opened easily, and the bottle cap also has a drinking water pipe, so that a flip cover of the drinking water pipe can be opened for drinking.

To achieve the aforementioned objective, the present invention provides a bottle cap comprising a vacuum unit, a pressure relief unit and a drinking water pipe unit, such that after the bottle cap is combined with a bottle, the vacuum unit vacuums the bottle to preserve the food stored in the bottle; and the pressure relief unit may be operated to release the air pressure inside the bottle in order to open the bottle cap, or open a flip cover of the drinking water pipe to drink the food such as a fruit juice or water stored in the bottle. This invention has the effect of maintaining the food stored in the bottle fresh and providing a convenient use for drinking.

2

DETAILED DESCRIPTION OF THE PREFERRED EMBODIMENTS

The technical characteristics, contents, advantages and effects of the present invention will be apparent with the detailed description of a preferred embodiment accompanied with related drawings as follows.

Figure 4:
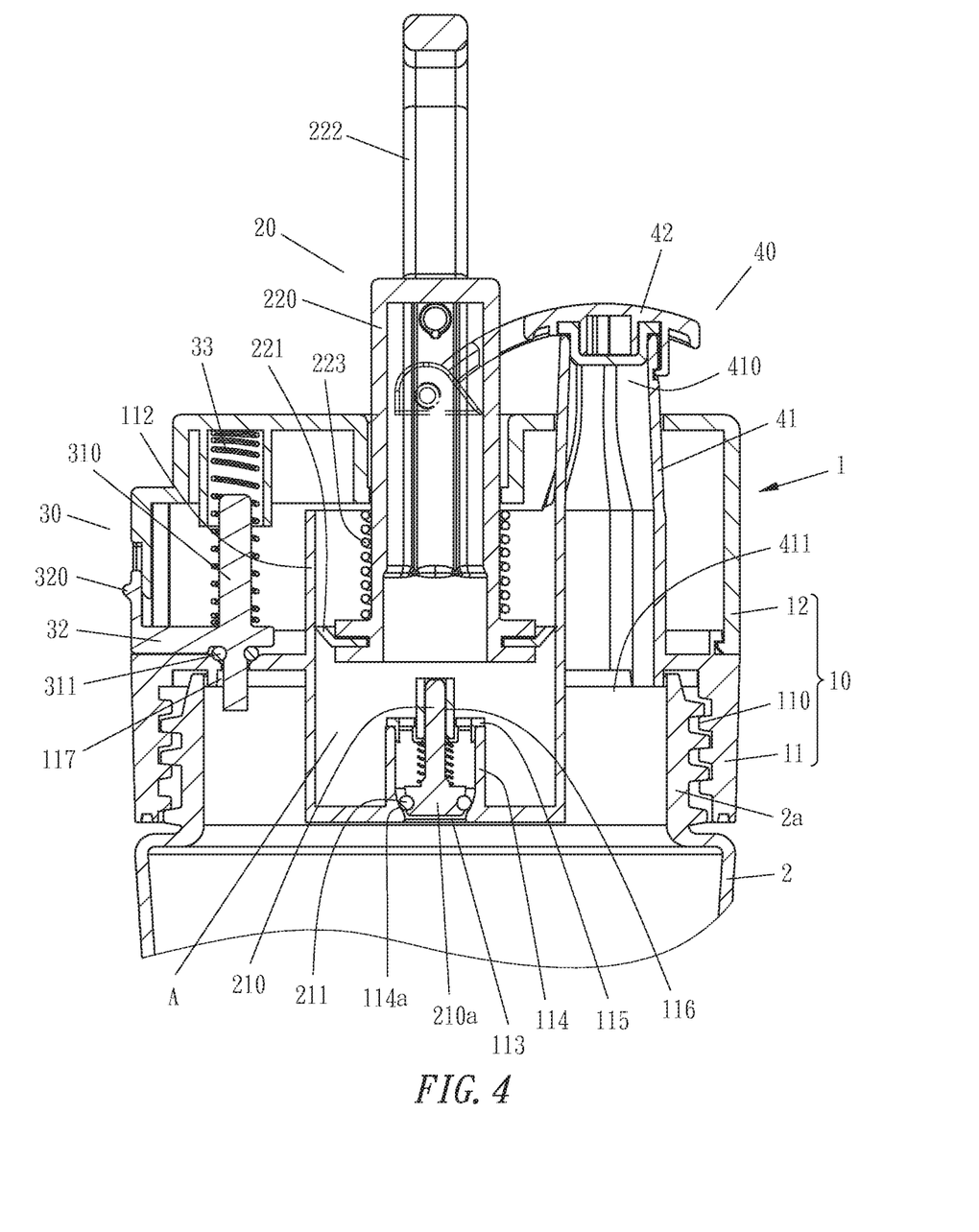
FIG. 4 is a blowup view of FIG. 3.
Figure 5:
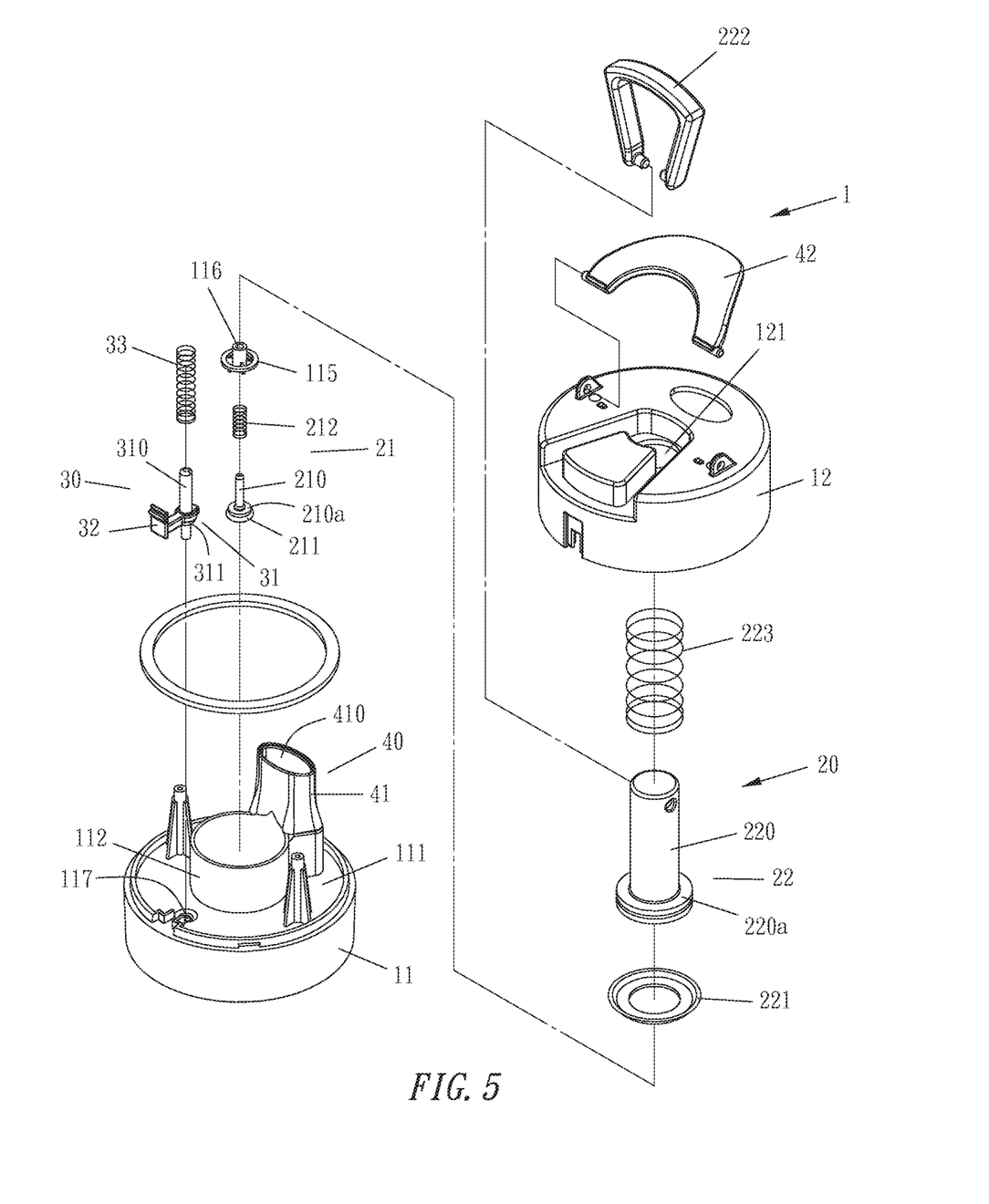
FIG. 5 is an exploded view of a bottle cap according to an embodiment of the present invention.

With reference to FIGS. 2 to 5 for a bottle cap in accordance with an embodiment of the present invention, the bottle cap structure 1 comprises the following elements:

A cap 10 has a main body 11 and a main body cover 12 combined with the top of the main body 11 by a snapping method, wherein the main body 11 is substantially in the shape of a cover having an internal thread surface 110 at the bottom of the main body 11 for combining a bottle mouth 2a of a bottle 2 and a configuration surface 111 at the top of the main body 11 for covering the bottle mouth 2a. The configuration surface 111 has a cylindrical piston cylinder 112 extended upwardly therefrom and the configuration surface 111 disposed inside the piston cylinder 112 has a vent 113 (as shown in FIG. 4), and the periphery of the vent 113 has a configuration cylinder 114 extended upwardly from the configuration surface 111, and the inner wall of the configuration cylinder 114 proximate to the vent 113 is an arc surface 114a. A lid 115 is covered onto the top of the configuration cylinder 114, and the middle of the lid 115 has a lid opening 116.

A vacuum unit 20 is installed to the inner side of the main body cover 12 and comprises a one-way outlet valve 21 and a piston device 22. The one-way outlet valve 21 is installed to the inner side of the configuration cylinder 114 and comprises a valve stem 210, a sealing ring 211 and a first spring 212. The valve stem 210 is disposed at the top of the vent 113, and the bottom has a tapered base 210a. The sealing ring 211 is sheathed on the peripheral surface of the base 210a and protruding outwardly to touch the arc surface 114a. The first spring 212 is sheathed between the base 210a and the lid 115, so that the first spring 212 permanently pushes the valve stem 210 downward to achieve the effect of blocking the vent 113. The piston device 22 is installed in the piston cylinder 112 and disposed at a position with an interval apart from the top of the one-way outlet valve 21, and the piston device 22 comprises a piston rod 220, and a piston 221, a pull handle 222 and a second spring 223 added to the outer side of a convex wall 220a at the bottom of the piston rod 220. The top of the piston rod 220 is passed through a notch 121 of the main body cover 12 and disposed at the top of the main body cover 12, and the bottom of the pull handle 222 is coupled to the top of the piston rod 220. After the pull handle 222 is hooked by a user's finger and lifted upward, the piston rod 220 is driven to slide upward. The outer edge of the piston 221 is in a tapered shape and in contact with an inner cylindrical wall of the piston cylinder 112. The second spring 223 is sheathed on the outer side of the piston rod 220, and the top of the second spring 223 touches the main body cover 12 for positioning, and the bottom of the second spring 223 is contacted and coupled to the top surface of the convex wall 220a disposed at the bottom of the piston rod 220, so that the second spring 223 has a force for permanently pushing the piston rod 220 downward.

A pressure relief unit 30 comprises a pressure relief valve 31, a control board 32 and a third spring 33, and is installed in the main body cover 12, and the configuration surface 111 has a penetrating pressure relief hole 117 configured to be corresponsive to the pressure relief valve 31. The pressure relief valve 31 has a pressure relief shaft 310, and the bottom of the pressure relief shaft 310 passes into the pressure relief hole 117, and an air barrier ring 311 is disposed on the outer side of the top of the pressure relief hole 117. The control board 32 has an end fixed to the outer wall of the pressure relief shaft 310 and the other end passing out from the outer side of the main body cover 12 and has a bent section 320 attached to the outer wall of the main body cover 12. The third spring 33 is sheathed on the outer side of the pressure relief shaft 310 and has a top touching the main body cover 21 for positioning and a bottom touching the control board 32, so that the third spring 33 has the effect of permanently pushing the pressure relief valve 31 downward to block the pressure relief hole 117.

A drinking water pipe unit 40 comprises a drinking water pipe 41 and a flip cover 42. The drinking water pipe 41 is in a tubular shape penetrating from top to bottom, and formed by partitioning the main body 11, and the upper pipe opening 410 of the drinking water pipe 41 penetrates the main body cover 12, and the lower pipe opening 411 is communicated to the bottle 2. The flip cover 42 has an end pivotally coupled to the top surface of the main body cover 12 by a pivot shaft and the other end provided for sealing and covering the upper pipe opening 410.

Figure 2:
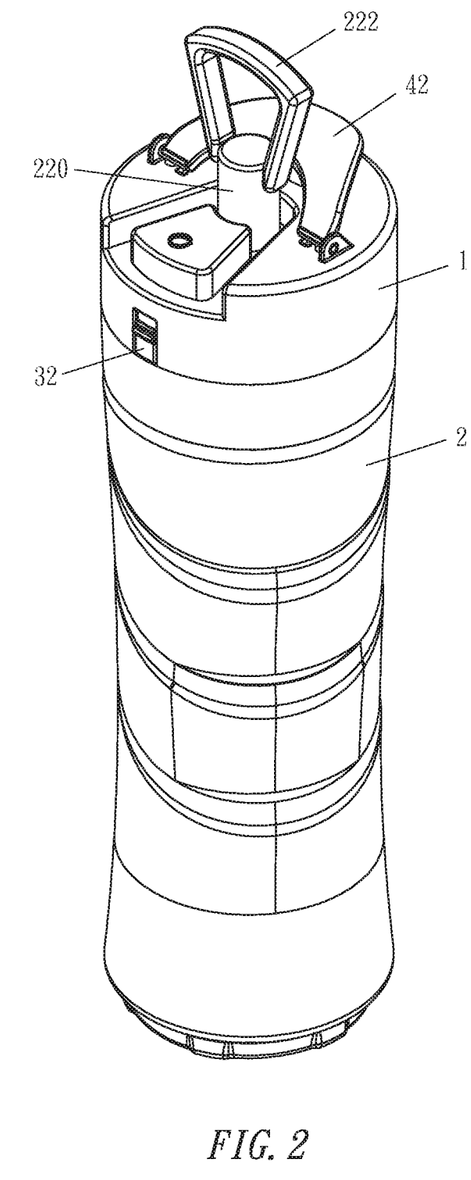
FIG. 2 is a perspective view of a bottle cap combined with a bottle according to an embodiment of the present invention.
Figure 3:
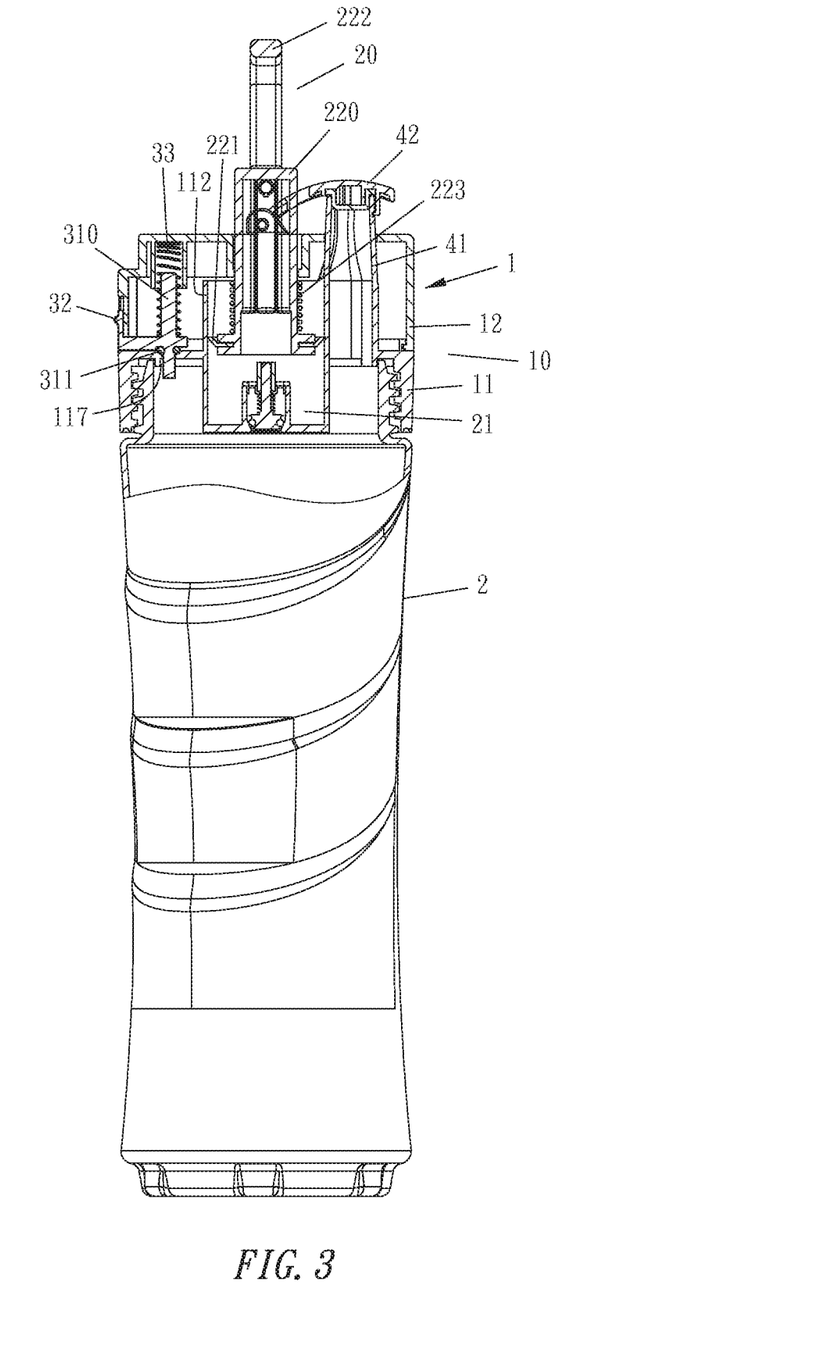
FIG. 3 is a cross-sectional view of a bottle cap combined with a bottle according to an embodiment of the present invention.

After the aforementioned components are assembled sequentially as shown in FIG. 2, fruits and vegetables may be stored in the bottle 2, and the base of the blender may be combined, so that after the fruits and vegetables are blended to produce a fruit juice, the bottle 2 can be separated from the base of the blender, and the bottle mouth 2a may be combined with the bottle cap 1 of the present invention again.

Figure 6:
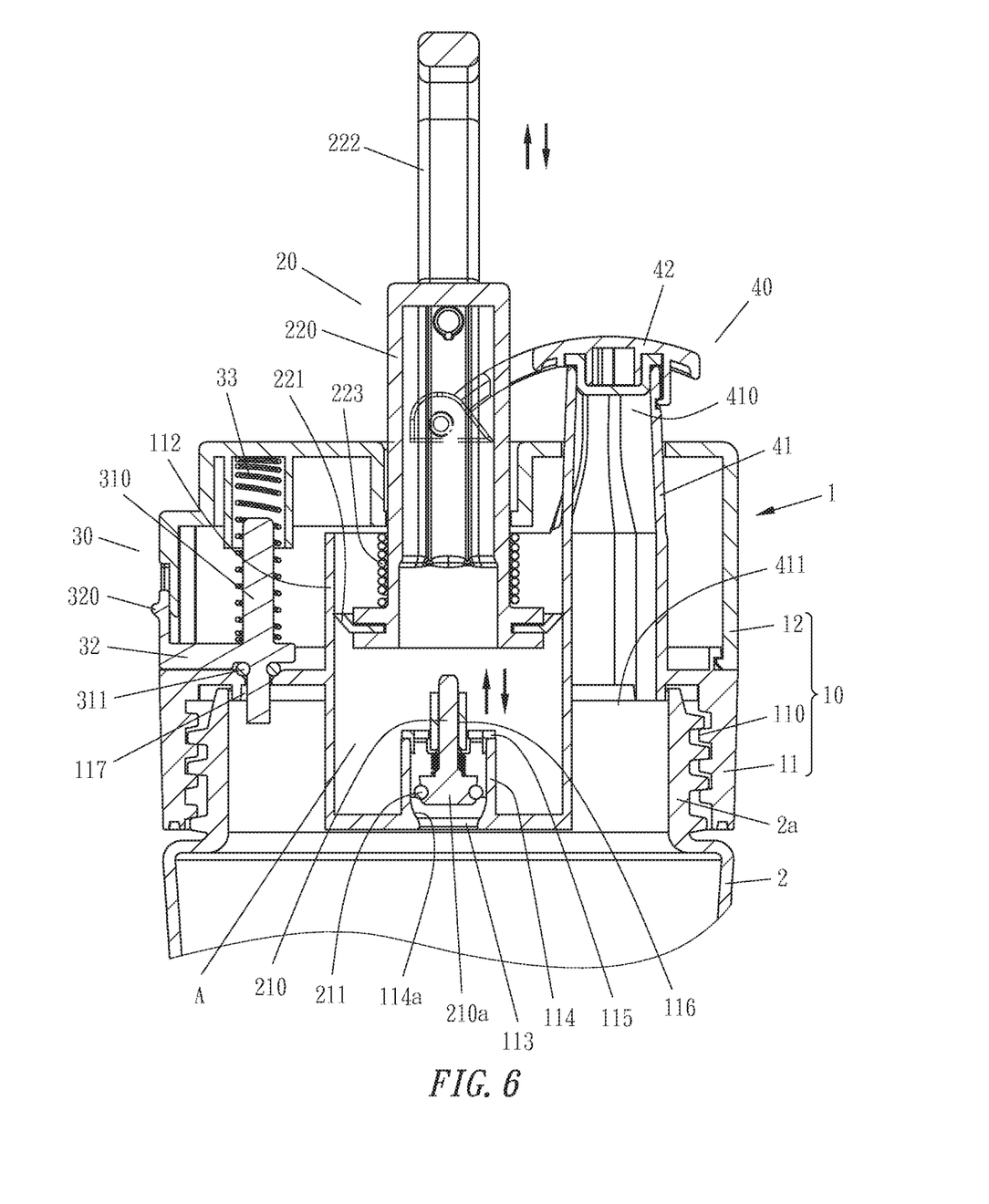
FIG. 6 is a schematic view of performing a vacuum operation in accordance with an embodiment of the present invention.

The application of the bottle cap structure is described below:

1. The bottle 2 is vacuumed as shown in FIG. 6, and a user may lift the pull handle 222 by a hand, so that the piston rod 220 is driven to compress the second spring 223 to slide upward. Since the periphery of the piston 221 touches the inner cylindrical wall of the piston cylinder 112, therefore a suction is formed in the space under the piston 221 to pull the one-way outlet valve 21 upward to separate from the vent 113, so that the air inside the bottle 2 is communicated with the interior of the piston cylinder 112, and some air inside the bottle 2 is sucked through the vent 113 to enter into a space A in the piston cylinder 112 under the piston 221. When pull handle 222 is released (as shown in FIG. 4), the piston rod 220 and the one-way outlet valve 21 are pushed downward to resume their original positions by the resilience of the second spring 223 and the first spring 212 respectively, and the one-way outlet valve 21 is recovered to block the vent 113. The air situated at the original position in the space A, so that the air pressure in the space under the piston 221 is too large, and the air will be moved downward with the piston 221 to push and deform the soft piston 221 and discharged upwardly. By repeating the aforementioned operation of the pull handle 222, the piston rod 220 can achieve the effect of vacuuming the bottle 2, so as to keep the food stored in the bottle 2 fresh and provide a long expiration date of the food.

Figure 7:
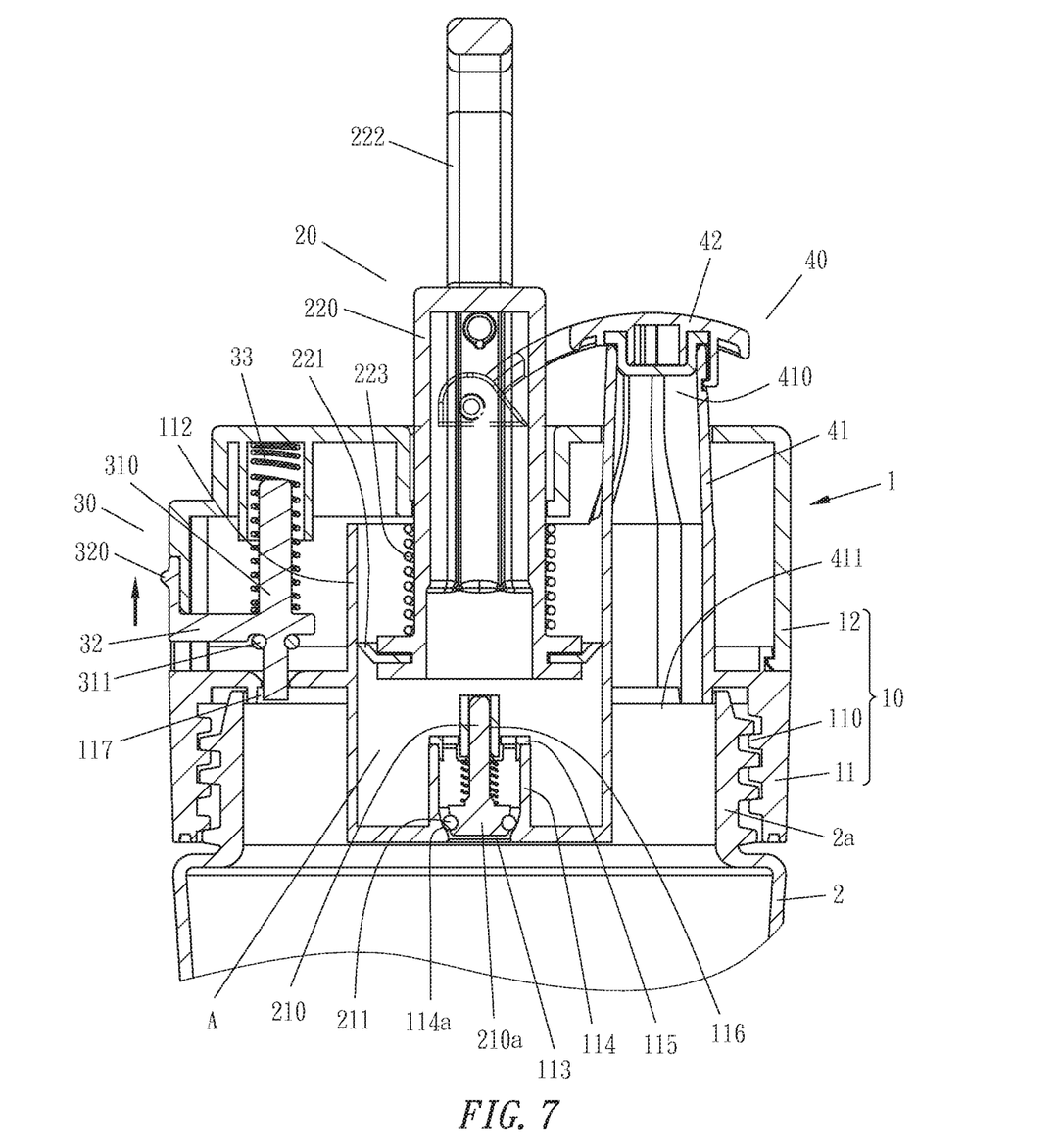
FIG. 7 is a schematic view of performing a pressure relief operation in accordance with an embodiment of the present invention.
Figure 8:
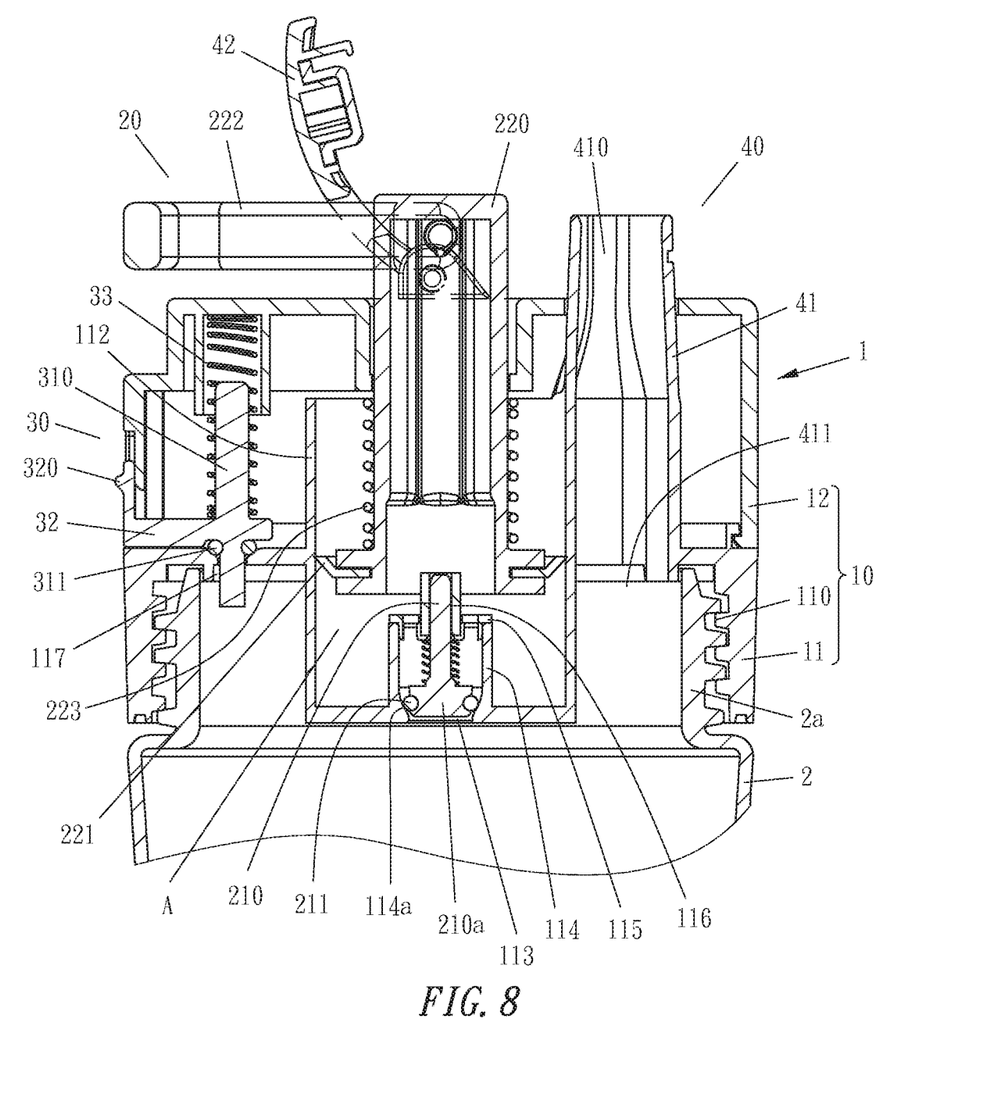
FIG. 8 is a schematic view showing the status after the pressure of a bottle is relieved and a flip cover is opened in accordance with an embodiment of the present invention.

2. When it is necessary to open the bottle cap 1 or drink the fruit juice, the control board 32 is lifted up to overcome the resilience of the third spring 33 as shown in FIG. 7, so that the air barrier ring 311 is pushed to move upward and separate the pressure relief hole 117. Now, the air outside the bottle 2 enters into the bottle 2 from the pressure relief hole 117. Under this situation, the bottle cap 1 can be opened, or the flip cover 42 can be opened to use drinking water pipe 41 as a straw for drinking the fruit juice.

In summation of the description above, the present invention has the following advantageous effects.

1. The bottle cap can be combined with a bottle to vacuum the bottle in order to keep the food stored in the bottle fresh and provide a long expiration date of the food.

2. In addition to the feature of the bottle cap that can be opened for drinking a fruit juice, the drinking water pipe can be used as a straw for drinking after the flip cover is opened.

While the present invention has been described by means of specific embodiments, numerous modifications and variations could be made thereto by those skilled in the art without departing from the scope and spirit of the invention set forth in the claims.

What is claimed is:

1. A bottle cap structure, comprising a vacuum unit, a pressure relief unit and a drinking water pipe unit installed in a bottle cap, characterized in that the bottle cap comprises a piston cylinder installed therein, a vent disposed at a bottom surface inside the piston cylinder and communicated to a bottom of the bottle cap, and a pressure relief hole with a bottom also communicated to the bottom of the bottle cap;

the vacuum unit is installed in the interior of the piston cylinder and includes a one-way outlet valve and a piston device; and the one-way outlet valve is installed at the top of the vent and has a valve stem, a sealing ring and a first spring; and the valve stem is disposed at the top of the vent and an outer side of a bottom of the valve stem is sheathed on and fixed to the sealing ring for blocking the vent; and the first spring is sheathed on the valve stem and has the effect of always pushing the valve stem downward to block the vent by the sealing ring; and the piston device is installed in the piston cylinder and disposed at a position with a gap from the top of the one-way outlet valve and includes a piston rod, a piston and a second spring are added and fixed to an outer side of a bottom of the piston rod; a top of the piston rod is passed through a notch of the bottle cap and disposed at the top of the bottle cap; an outer edge of the piston is in a thin shape and in contact with an inner cylindrical wall of the piston cylinder; the second spring is sheathed on the outer side of the piston rod to provide a force permanently pushing the piston rod downward;

the pressure relief unit is installed above the pressure relief hole, and has a pressure relief valve, a control board and a third spring; and the pressure relief valve has a pressure relief shaft, and an air barrier ring disposed on an outer wall of a bottom of the pressure relief shaft; the control board has an end fixed to an outer wall of the pressure relief shaft and another end passing out from an outer side of the bottle cap;

the third spring is sheathed on the outer side of the pressure relief shaft and provided for permanently pushing the air barrier ring of the pressure relief valve downward to block the pressure relief hole;

the drinking water pipe unit has a drinking water pipe and a flip cover, and the drinking water pipe is in a tubular shape penetrating from top to bottom and disposed in the bottle cap, and an upper pipe opening of the drinking water pipe penetrates through the top of the bottle cap, and the lower pipe opening is communicated to the bottom of the bottle cap; and the flip cover is disposed at the top of the bottle cap for sealing and covering the upper pipe opening.

2. The bottle cap structure of claim 1, wherein the bottle cap is composed of a main body and a main cover body combined to the top of the main body by a snapping method; and the piston cylinder, the pressure relief hole and the drinking water pipe are installed onto a configuration surface at the top of the main body.

3. The bottle cap structure of claim 2, wherein the configuration surface has a configuration cylinder configured to be corresponsive to the position of the vent and extending upwardly from the periphery of the vent, and an inner wall of the configuration cylinder adjacent to the vent is an arc surface; a lip is covered onto the top of the configuration cylinder, and a lid opening is formed at the middle of the lid and provided for passing a top of the valve stem to the outside, and a tapered base is disposed on the bottom of the valve stem; the sealing ring is sheathed on the peripheral surface of the tapered base and protruding outwardly to be in contact with the arc surface, and the first spring is sheathed between the tapered base and the lid.

4. The bottle cap structure of claim 3, wherein the top of the piston rod is pivotally coupled to a pull handle, and the top of the second spring is contacted and coupled with the main body cover for positioning, and the bottom of the piston rod is contacted and coupled with a convex wall.

5. The bottle cap structure of claim 3, wherein the bottom of the pressure relief shaft is passed into the pressure relief hole, and the top of the third spring is contacted, coupled, and fixed to the main body cover, and the bottom of the third spring is contacted and coupled to an end of the pressure relief shaft which is coupled to the control board.

6. The bottle cap structure of claim 3, wherein the flip cover has an end pivotally coupled to the top surface of the main body cover by a pivot shaft and another end provided for sealing and covering the upper pipe opening.

\* \* \* \* \*